United States Patent
Talamantez et al.

(10) Patent No.: US 6,505,408 B1
(45) Date of Patent: Jan. 14, 2003

(54) LEVELING TROWEL

(76) Inventors: Ernesto Talamantez, 2016 Webster, Lansing, MI (US) 48911; Arthur Talamantez, 2016 Webster, Lansing, MI (US) 48911; Susan M. Anderson, 2016 Webster, Lansing, MI (US) 48911

( * ) Notice: Subject to any disclaimer, the term of this patent is extended or adjusted under 35 U.S.C. 154(b) by 34 days.

(21) Appl. No.: 09/802,538

(22) Filed: Mar. 9, 2001

(51) Int. Cl.[7] .............................. B05C 17/10; G01C 9/00
(52) U.S. Cl. ........................... 33/334; 33/518; 15/235.4
(58) Field of Search ..................... 33/333, 334, 518, 33/451, 354; 15/235.4, 235.5, 235.6, 235.7, 235.8, 245.1; D8/10

(56) References Cited

U.S. PATENT DOCUMENTS

| | | | |
|---|---|---|---|
| 1,490,220 A | 4/1924 | Lawrence | |
| 1,617,125 A | 2/1927 | Kuhar | |
| D150,715 S | 8/1948 | King | |
| 3,302,233 A | * 2/1967 | Sebastiani | 15/235.4 |
| 4,703,564 A | 11/1987 | Cornelius | |
| 5,046,387 A | 9/1991 | Levake | |
| 5,154,536 A | 10/1992 | Ciudaj | |
| 5,208,990 A | * 5/1993 | Woerlein | 33/354 |
| 5,388,338 A | 2/1995 | Majors | |
| 6,178,586 B1 | * 1/2001 | Jafarmadar | 15/235.4 |

* cited by examiner

*Primary Examiner*—Christopher W. Fulton

(57) ABSTRACT

A leveling trowel for ensuring a level surface when using a trowel. The leveling trowel includes a plate having a top surface, a bottom surface and a peripheral edge. The plate is rigid and has a generally rectangular shape. A handle member is securely attached to the plate. The handle member has an outer surface, an inner surface and a pair of side surfaces. The handle member has a chamber therein. The outer surface has first window therein extending to and exposing the chamber. A spirit level is positioned in the chamber and orientated for determining a horizontal orientation of the plate.

4 Claims, 2 Drawing Sheets

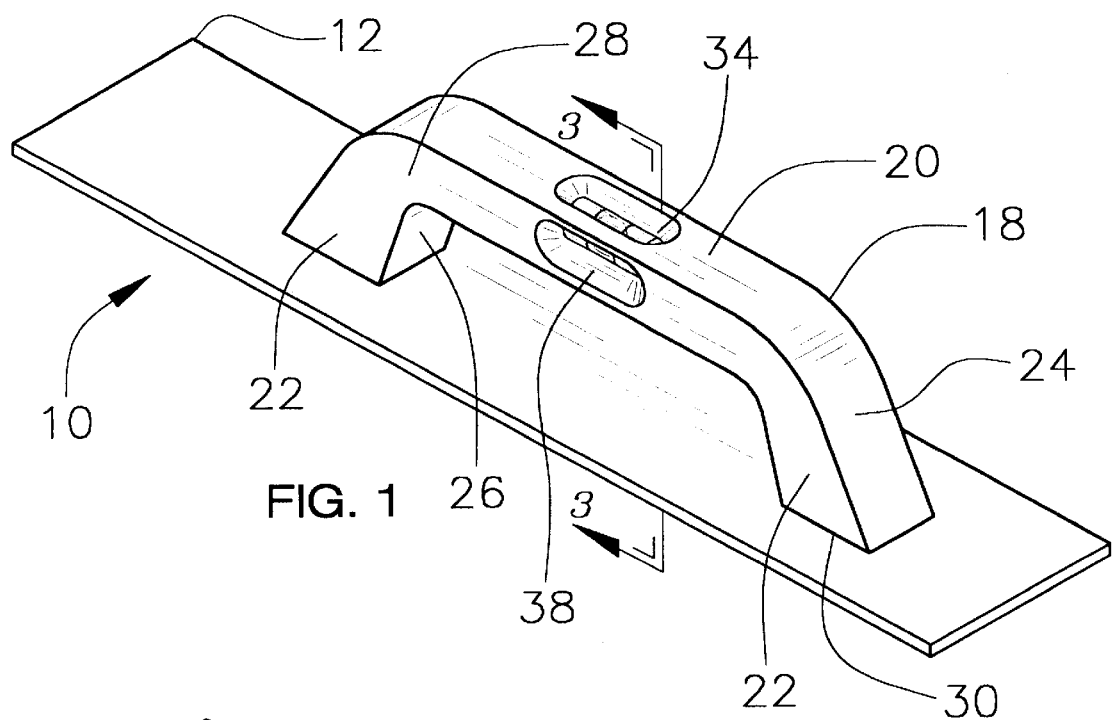
FIG. 1
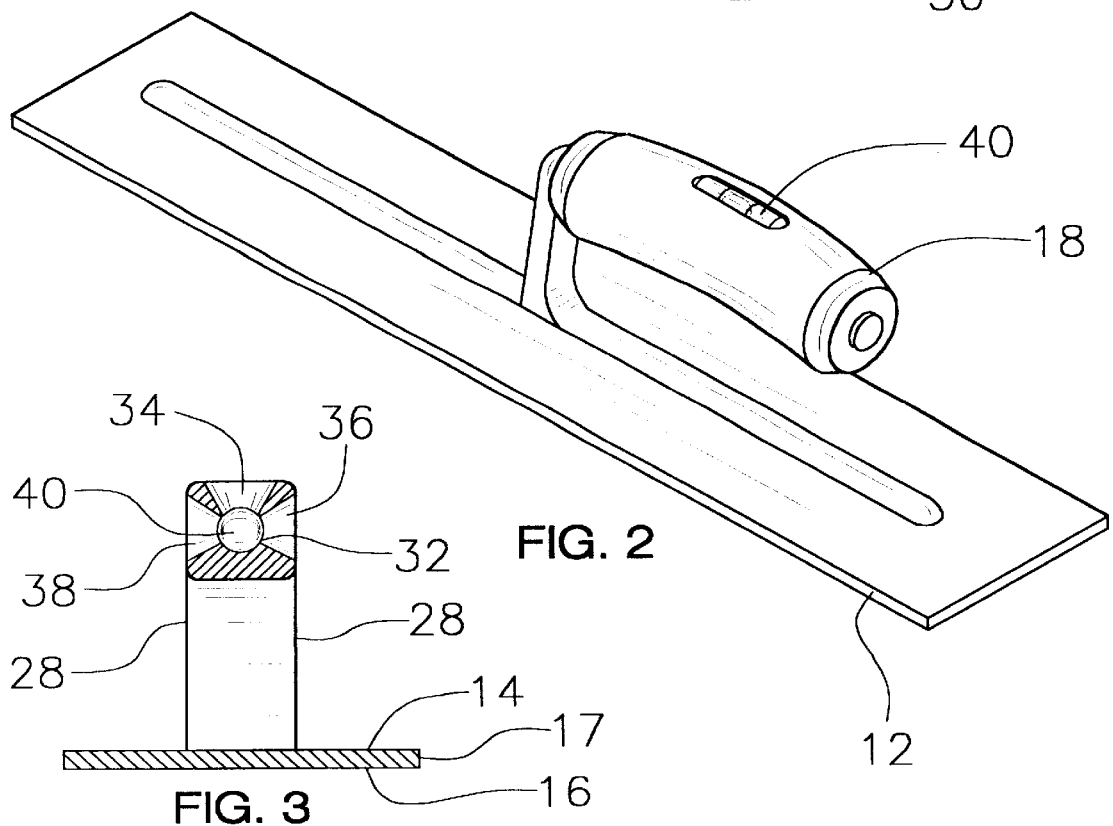
FIG. 2
FIG. 3

LEVELING TROWEL

BACKGROUND OF THE INVENTION

1. Field of the Invention

The present invention relates to trowel devices and more particularly pertains to a new leveling trowel for ensuring a level surface when utilizing a trowel.

2. Description of the Prior Art

The use of trowel devices is known in the prior art. More specifically, trowel devices heretofore devised and utilized are known to consist basically of familiar, expected and obvious structural configurations, notwithstanding the myriad of designs encompassed by the crowded prior art which have been developed for the fulfillment of countless objectives and requirements.

Known prior art includes U.S. Des. Pat. No. 150,715; U.S. Pat. Nos. 1,490,220; 1,617,125; 5,154,536; 5,388,338; 4,703,564; and 5,046,387.

While these devices fulfill their respective, particular objectives and requirements, the aforementioned patents do not disclose a new leveling trowel. The inventive device includes a plate having a top surface, a bottom surface and a peripheral edge. The plate is rigid and has a generally rectangular shape. A handle member is securely attached to the plate. The handle member has an outer surface, an inner surface and a pair of side surfaces. The handle member has a chamber therein. The outer surface has first window therein extending to and exposing the chamber. A spirit level is positioned in the chamber and orientated for determining a horizontal orientation of the plate.

In these respects, the leveling trowel according to the present invention substantially departs from the conventional concepts and designs of the prior art, and in so doing provides an apparatus primarily developed for the purpose of ensuring a level surface when utilizing a trowel.

SUMMARY OF THE INVENTION

In view of the foregoing disadvantages inherent in the known types of trowel devices now present in the prior art, the present invention provides a new leveling trowel construction wherein the same can be utilized for ensuring a level surface when utilizing a trowel.

The general purpose of the present invention, which will be described subsequently in greater detail, is to provide a new leveling trowel apparatus and method which has many of the advantages of the trowel devices mentioned heretofore and many novel features that result in a new leveling trowel which is not anticipated, rendered obvious, suggested, or even implied by any of the prior art trowel devices, either alone or in any combination thereof.

To attain this, the present invention generally comprises a plate having a top surface, a bottom surface and a peripheral edge. The plate is rigid and has a generally rectangular shape. A handle member is securely attached to the plate. The handle member has an outer surface, an inner surface and a pair of side surfaces. The handle member has a chamber therein. The outer surface has first window therein extending to and exposing the chamber. A spirit level is positioned in the chamber and orientated for determining a horizontal orientation of the plate.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new leveling trowel apparatus and method which has many of the advantages of the trowel devices mentioned heretofore and many novel features that result in a new leveling trowel which is not anticipated, rendered obvious, suggested, or even implied by any of the prior art trowel devices, either alone or in any combination thereof.

It is another object of the present invention to provide a new leveling trowel which may be easily and efficiently manufactured and marketed.

It is a further object of the present invention to provide a new leveling trowel which is of a durable and reliable construction.

An even further object of the present invention is to provide a new leveling trowel which is susceptible of a low cost of manufacture with regard to both materials and labor, and which accordingly is then susceptible of low prices of sale to the consuming public, thereby making such leveling trowel economically available to the buying public.

Still yet another object of the present invention is to provide a new leveling trowel which provides in the apparatuses and methods of the prior art some of the advantages thereof, while simultaneously overcoming some of the disadvantages normally associated therewith.

Still another object of the present invention is to provide a new leveling trowel for ensuring a level surface when utilizing a trowel.

Yet another object of the present invention is to provide a new leveling trowel which includes a plate having a top surface, a bottom surface and a peripheral edge. The plate is rigid and has a generally rectangular shape. A handle member is securely attached to the plate. The handle member has an outer surface, an inner surface and a pair of side surfaces. The handle member has a chamber therein. The outer surface has first window therein extending to and exposing the chamber. A spirit level is positioned in the chamber and orientated for determining a horizontal orientation of the plate.

Still yet another object of the present invention is to provide a new leveling trowel that allows a user to ensure a horizontal and level surface while using a trowel without additional devices.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 1 is a schematic perspective view of a new leveling trowel according to the present invention.

FIG. 2 is a schematic perspective view of the present invention.

FIG. 3 is a schematic cross-sectional view taken along line 3—3 of FIG. 1 of the present invention.

DESCRIPTION OF THE PREFERRED EMBODIMENT

Figure 4:
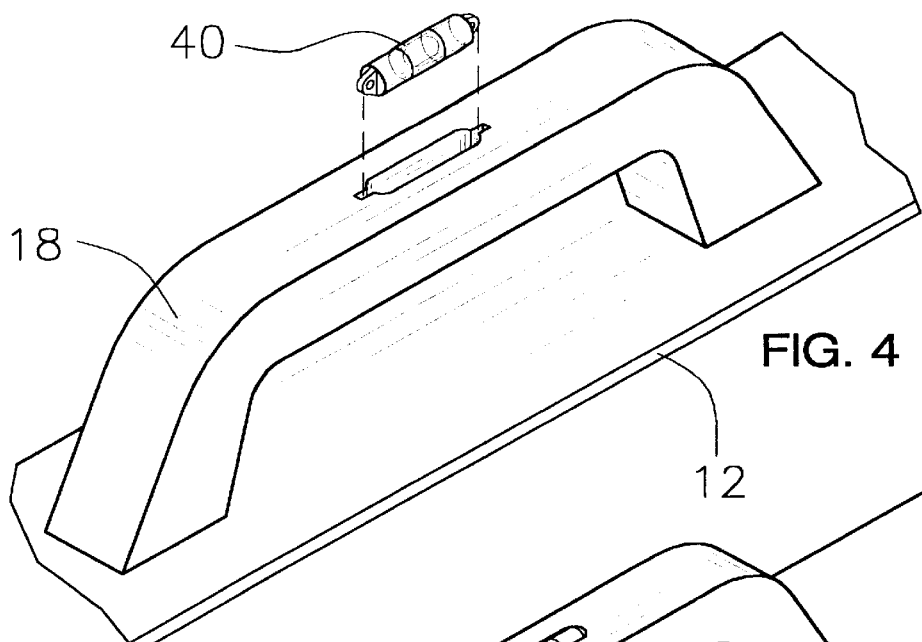
FIG. 4 is a schematic perspective view of the present invention.

With reference now to the drawings, and in particular to FIGS. 1 through 6 thereof, a new leveling trowel embodying the principles and concepts of the present invention and generally designated by the reference numeral 10 will be described.

As best illustrated in FIGS. 1 and 3, the preferred embodiment of the leveling trowel 10 generally comprises a plate 12 having a top surface 14, a bottom surface 16 and a peripheral edge 17. The plate 12 is rigid and has a generally rectangular shape.

A handle member 18 includes an elongated member 20 and a pair of legs 22. Each of the legs 22 is coupled to one of an opposite pair of ends of the elongated member 20 such that the handle member 18 has a generally U-shaped configuration. The handle member 18 has an outer surface 24, an inner surface 26 and a pair of side surfaces 28. Each of the legs 22 has a free end 30 securely attached to the top surface 14 of the plate 12. The elongated member 20 has a chamber 32 therein. The chamber 32 is positioned generally between the legs 22 of the handle member 18. The outer surface 24 has first window 34 therein extending to and exposing the chamber 32. Each of the side surfaces 28 has a respective second window 36 and a third window 38 therein extending to and exposing the chamber 32.

A spirit level 40 is positioned in the chamber 32 and orientated for determining a horizontal orientation of the plate 12. The spirit level 40 being viewable through the three windows 34, 36, 38.

Figure 5:
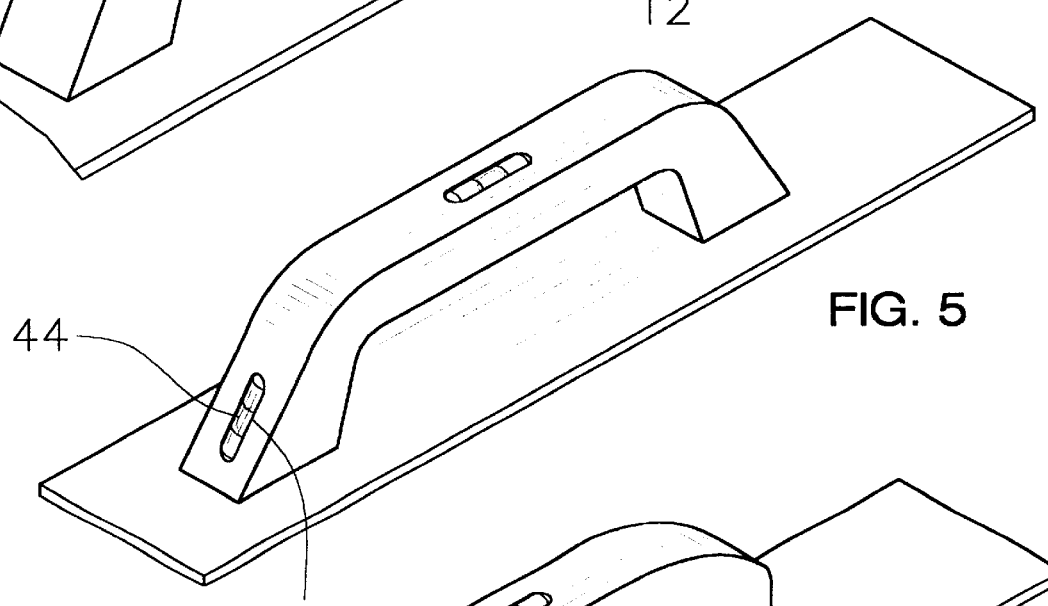
FIG. 5 is a schematic perspective view of the present invention.
Figure 6:
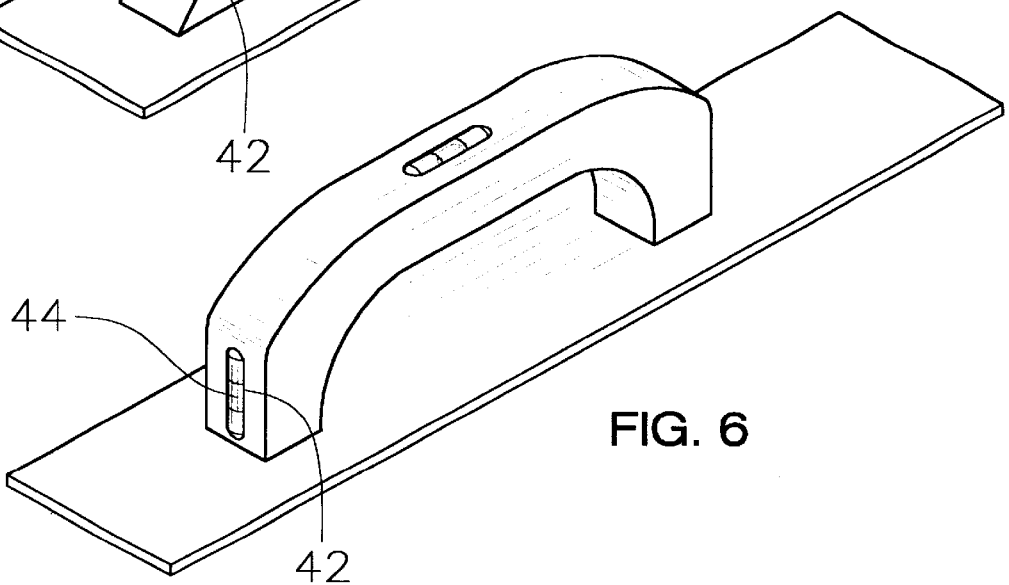
FIG. 6 is a schematic perspective view of the present invention.

A second embodiment is shown in FIGS. 2 and 4 and have different handle member 18 configurations having only one window in the outer surface 24. The spirit level 40 may be removed as shown in FIG. 4. FIGS. 5 and 6 include legs 22 having a slot 42 therein and having a second spirit level 44 at 45 degrees or 90 degrees respectively.

In use, the device 10 is used as a conventional trowel. The spirit levels 40, 44 allow a user to ensure that they are leveling the materials on an even plane. The first embodiment includes three windows for viewing the spirit level 40 from multiple angles.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

We claim:

1. A leveling trowel device comprising:

a plate having a top surface, a bottom surface and a peripheral edge, said plate being rigid and having a generally rectangular shape;

a handle member being securely attached to said plate, said handle member having an outer surface, an inner surface and a pair of side surfaces, said handle member having a chamber therein, said outer surface having first window therein extending to and exposing said chamber;

a spirit level being positioned in said chamber and orientated for determining a horizontal orientation of said plate;

wherein said handle member includes an elongated member and a pair of legs, each of said legs being coupled to one of an opposite pair of ends of said elongated member such that said handle member has a generally U-shaped configuration; and a second spirit level positioned in a slot extending into said outer surface of one of said legs, said second spirit level being orientated for determining a 45 degree orientation of said plate.

2. The leveling trowel device as in claim 1, wherein at least one of said side surfaces having a window therein extending to and exposing said chamber.

3. The leveling trowel device as in claim 1, wherein each of said side surfaces having a respective second window and a third window therein extending to and exposing said chamber.

4. A leveling trowel device comprising:

a plate having a top surface, a bottom surface and a peripheral edge, said plate being rigid and having a generally rectangular shape;

a handle member with an elongated member and a pair of legs, each of said legs being coupled to one of an opposite pair of ends of said elongated member such that said handle member has a generally U-shaped configuration, said handle member having an outer surface, an inner surface and a pair of side surfaces, each of said legs having a free end securely attached to said top surface of said plate, said elongated member having a chamber therein, said chamber being positioned generally between said legs of said handle member, said outer surface having first window therein extending to and exposing said chamber, each of said side surfaces having a respective second window and a third window therein extending to and exposing said chamber;

a spirit level being positioned in said chamber and orientated for determining a horizontal orientation of said plate; and a second spirit level positioned in a slot extending into said outer surface of one of said legs, said second spirit level being orientated for determining a 45 degree orientation of said plate.

* * * * *